3,444,386
ROTARY SCANNER IMAGING DEVICE WITH MIRRORS MOUNTED THEREIN FOR REFLECTING RADIATION ENERGY TO PHOTODETECTOR MEANS
Henri B. Diamant, State College, Pa., assignor to HRB-Singer, Inc., State College, Pa., a corporation of Delaware
Filed Sept. 29, 1966, Ser. No. 582,947
Int. Cl. H01j 3/16
U.S. Cl. 250—236       10 Claims This invention relates in general to mechanical imaging apparatus and more particularly to a mechanical scanner capable of providing a linear scan pattern.

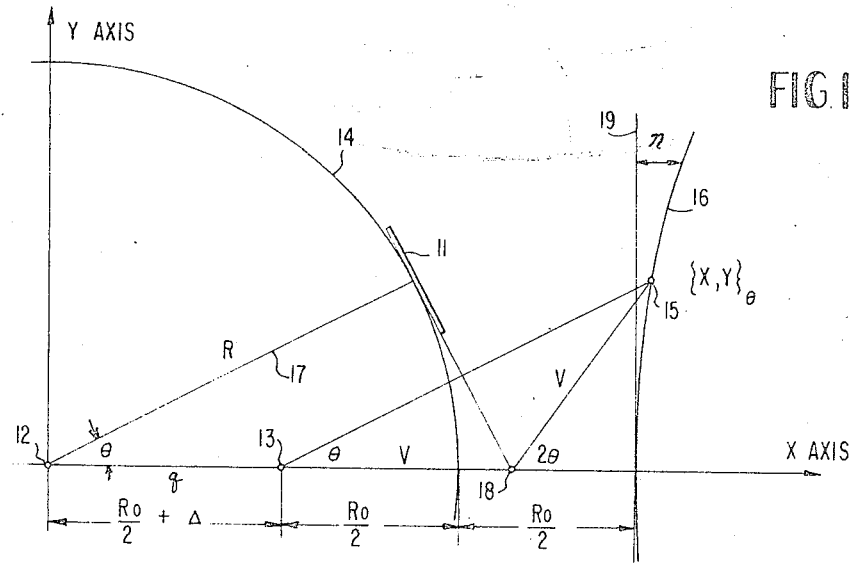
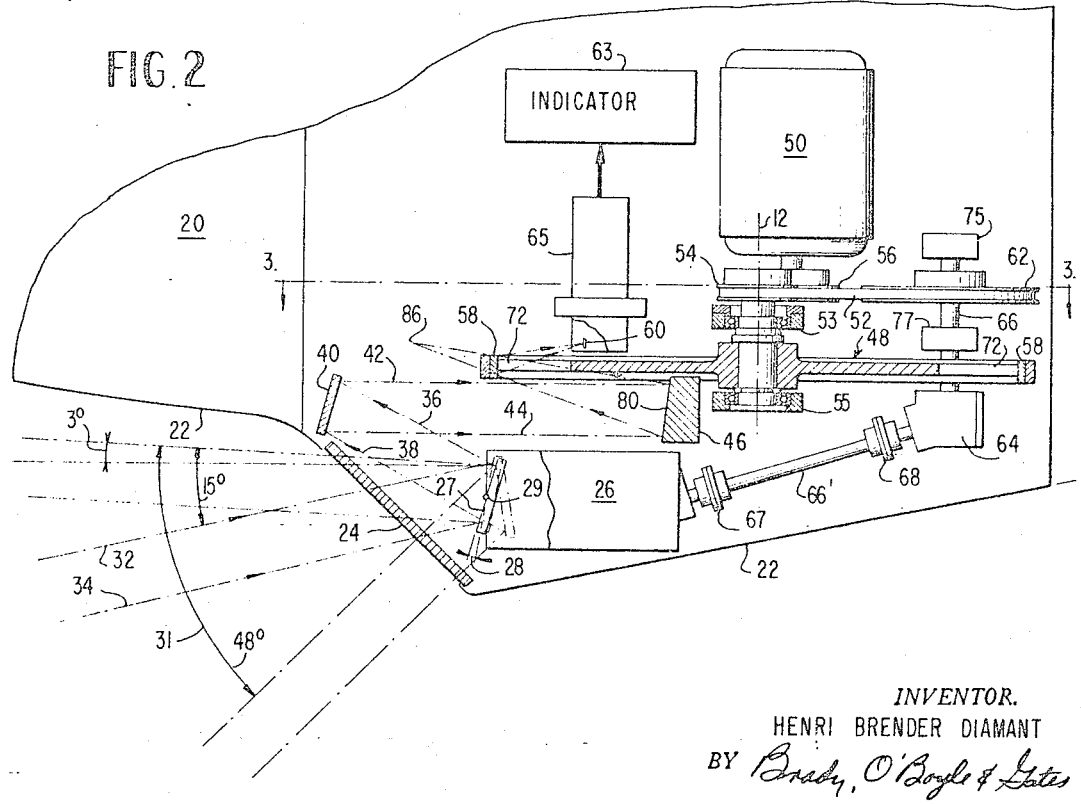

An imaging device consists in general of image forming optics and some form of detectors sensitive to electromagnetic radiation of the desired spectral region of use. When limitation in optics of detectors causes a smaller field of view than desired, the coverage is expanded by means of mechanical scanning. By this method, the detector is exposed in timed sequence to varying portions of the field of view. The detector, in turn, produces a time varying response signal which is displayed by means of any suitable method for displaying of time varying signals.

To achieve a high sensitivity in an imaging device with a given instantaneous field of view, the system is designed with an attempt to create a large optical aperture while using small detecting elements. The optical system is designed to form all radiation admitted by the optical aperture from the direction of the instantaneous field of view into a converging beam with a focal area at the detecting element.

The scan motion serves to vary the direction of the instantaneous field of view according to a predetermined pattern. In some airborne systems, for example, this scan pattern is a simple motion perpendicular to the line of flight while scan in the flight direction is provided by forward motion of the aircraft. Other systems utilize two dimensional scan patterns consisting of a combination of two motions which may be linear or curved. The scan motion is sometimes produced by moving the total optical system in unison. In general, however, mechanical motion is applied to only a part of the optics. The scanning portion of the optics may be one or more mirrors placed entirely outside of the optical collecting elements which is known as "object scan." In this case, the mirror determines the direction of the instantaneous field of view and it must be large enough to cover the entire optical aperture. The scanning element can be smaller and therefore easier to move when placed in the converging beam which is referred to as an "image scan." In the latter case, the mechanical motion controls not only the direction of the beam but must also provide accurate focal distances between collecting optics and the detector.

The optical elements themselves are either reflective or refractive. Refractive optics in general allow for compact optical design. Reflective optics, however, have the advantage of being achromatic, i.e., not limited to any spectral region, as in some spectral regions, refractive optics are unavailable. The detectors may consist of either a single element or multiple elements. Multiple element detectors increase the field of coverage for a given scan motion. The problem of over-scan, however, arises when the scan paths of the individual detectors overlap each other. When fast scan rates are required for an imaging device, the limiting factors are often the bulk, weight, speed and accuracy of the mechanical scan techniques.

It is an object of the present invention, therefore, to provide an improved mechanical line scanning device which permits operation in any spectral region.

It is another object of the present invention to provide a mechanical line scanning device which provides parallel scan paths for the individual photodetectors of a multiple detector array.

It is another object of the present invention to provide a mechanical imaging device with reduced size, weight and power requirements.

Still another object of the present invention is to provide a compact achromatic imaging device which provides a relatively high scan rate in proportion to the mechanical scan speed.

Other objects and advantages of the invention will become apparent as the following detailed description is read in conjunction with the drawings, in which:

FIGURE 1 is a diagram illustrative of the geometric principle utilized by the present invention;

FIGURE 2 is a side elevational view of the preferred embodiment of the subject invention and is shown partly in vertical cross section.

Figure 3:
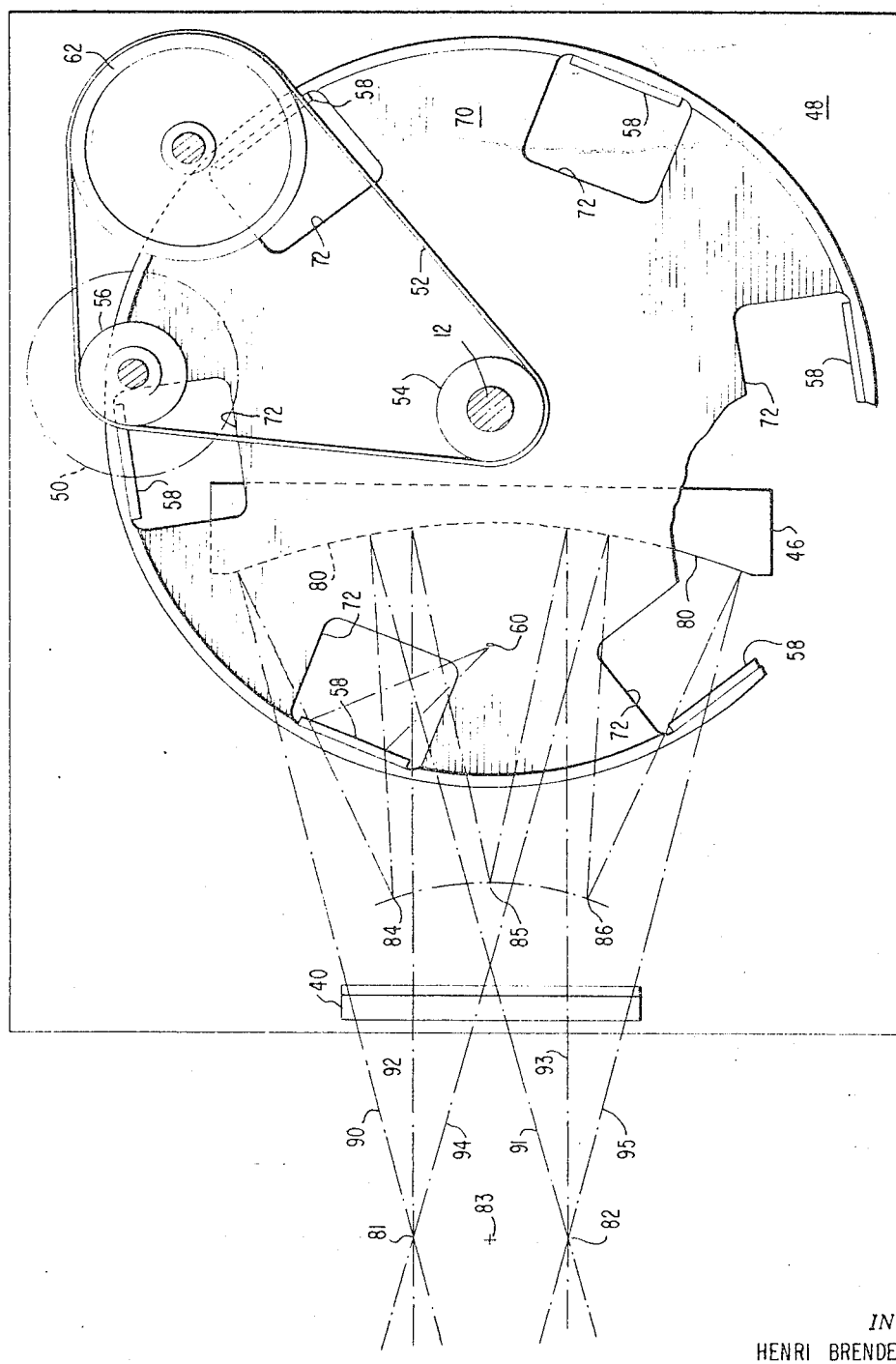
FIGURE 3 is a top plan view, partly in section, of the preferred embodiment of the subject invention taken substantially along line 3—3 of FIGURE 2.

Referring now to the figures, FIGURE 1 discloses a flat mirror 11 as seen from the top. This mirror rotates around an axis 12 parallel to the mirror surface. The axis 12 is chosen as the origin of a rectangular coordinate system having an X and Y axis. Another point 13 is placed on the X axis between point 12 and the circle 14 described by the surface of the mirror 11 as it rotates around the axis 12. The mirror or vertical image of the point 13 falls at a point 15 having coordinates (X, Y) which moves along the curve 16 as the mirror 11 rotates. The radius (R) of the mirror rotation arm is designated by reference numeral 17 while the distance ($q$) designates the distance from the rotation axis 12 to the fixed point 13. $\theta$ defines the rotation angle of mirror arm 17 measured from the X axis. The distance ($v$) is measured from the fixed point 13 to point 18 on the X axis. Reference character $n$ denotes the departure of curve 16 from the straight line 19.

An expression of the mirror 11 rotation can be developed as follows:

R: radius of mirror rotation arm 17
$q$: distance from rotation axis 12 to fixed point 13
$\theta$: rotation angle of mirror arm 17 measured from X axis
$v$: distance from fixed point 13 to intersection 18 between X axis and mirror surface
$n$: departure of X coordinate of curve 16 from a straight line 19.

From the geometry of the figure, it is apparent that $$v = \frac{R}{\cos \theta} - q$$

$$x = \frac{R}{\cos \theta} + v \cos 2\theta = R \frac{1 + \cos 2\theta}{\cos \theta} - q \cos 2\theta$$

$$x = 2R \cos \theta - q \cos 2\theta \qquad (1)$$

$$y = v \sin 2\theta = R \frac{\sin 2\theta}{\cos \theta} - q \sin 2\theta$$

$$y = 2R \sin \theta - q \sin 2\theta \qquad (2)$$

Utilizing the following series expansions of $\cos \theta$, $\sin \theta$ and $\tan \theta$.

$$\cos \theta = 1 - \frac{\theta^2}{2!} + \frac{\theta^4}{4!}$$

$$\sin \theta = \theta - \frac{\theta^3}{3!} + \frac{\theta^5}{5!}$$

$$\tan \theta = \theta + \frac{\theta^3}{3} + \frac{\theta^5}{15}$$

We find $$x = (2R-q) - \theta^2(R-2q) + \frac{\theta^4}{12}(R-8q)$$

$$y = 2\theta(R-q) - \frac{\theta^3}{3}(R-4q)$$

If we set $R = R_0 + \Delta$ and $q = \frac{1}{2}R_0 + \Delta$, substituting into the above equations, we find $$x = \frac{3}{2}R_0 + \Delta + \theta^2 \Delta - \frac{\theta^4}{12}(3R_0 + 7\Delta)$$

$$y = R_0 \theta + \frac{\theta^3}{3}(R_0 + 3\Delta)$$

From FIGURE 1 we see $\eta = x_0 - x_{(\theta=0)}$
If $\Delta < R_0$ and $\theta \leq .3$ radians (17.2°)

$$\eta \cong \theta^2 \Delta - \frac{\theta^4}{4} R_0 \quad (3)$$

$$y \cong R_0 \theta + \frac{\theta^3}{3} R_0 \cong R_0 \tan \theta \quad (4)$$

Now, letting curve 16 represent the image surface of an optical imaging device and letting point 13 represent the position of an optical detector element, the converging beam forming the image is intersected by mirror 11 and diverted to the focus on the detector element, not shown. From the mathematical expressions above, it becomes apparent that when the mirror travel $\theta$ is limited to approximately ±15 degrees (30 degrees total), one can achieve an accurate focus for a variety of image surface curvatures whether flat, concave or convex, by a proper choice of detector location, i.e., at point 13. If the optical axis of the imaging device coincides with the X axis of FIGURE 1, the curve 16 scanned by the mirror rotation will correspond to a substantially straight line in object space. If several detector elements are stacked on top of each other at point 13, the individual elements will scan parallel lines in object space.

A single line scan is performed by a rotation of 30 degrees or less of the mirror 11. It therefore becomes possible to provide a plurality of mirrors 11 along the circle 14 all rotating in unison. A carousel scanner is therefore contemplated with individual scan mirrors performing a line scan in sequence as the carousel rotates.

Referring now to FIGURE 2, there is shown a side view of the preferred embodiment of the subject invention. Reference numeral 20 designates a vehicle such as an aircraft in which the subject invention can be utilized. This is stated merely for the sake of example and is not meant to be interpreted in a limiting sense. The external surface 22 of the vehicle is interrupted to include a transparent window 24. The window 24 moreover is located on the underside of the vehicle 20 and is disposed such that it is exposed to a field of view forwardly and below the vehicle. The window 24 moreover is adapted to be transparent not only to visible light but also to invisible light such as infrared and ultra-violet radiation. Inside of the vehicle 20 and behind the window 24 is located a scanning mirror rocking and tilting mechanism assembly 26 including a flat scanning mirror 27 which is selectively movable by means of the assembly 26. The scanning mirror 27 is an object scanning device and is adapted to be rocked through a predetermined rocking angle 28 about the point 29 as well as tilted away from point 29 such that a tilting angle 31 is established which is greater than the rocking angle 28. The rocking angle determines the vertical field of view for a fixed tilt location, while the tilting angle determines the overall limit of the field of view for the mirror 27. Assuming that the mirror 27 is temporarily stationary, a field of view as observed along lines 32 and 34 would be reflected from the flat mirror 27 as lines 36 and 38 respectively.

A plane mirror 40 is located outside of the view of the window 24 and is fixed in a stationary position such that it can receive the reflected image from the scanning mirror 27. It would receive the reflected lines 36 and 38 and fold the image included therein as a second reflected image as defined by lines 42 and 44.

The reflected image from the stationary plane mirror 40 is directed to the mirror segment 46 which has a concave reflecting surface of a predetermined spherical contour. The image that appears on the reflecting surface of the mirror segment 46 is adapted to be scanned by means by the carousel scanner 48 shown in partial vertical sectional view. The carousel scanning apparatus 48 is shown in greater detail in FIGURE 3 and will be explained subsequently. The carousel scanner 48 is shown mounted in a substantially horizontal position with respect to travel of the vehicle 20 by means of bearings 53 and 55 and is rotated about its center axis 12 by means of the drive motor 50. A timing belt drive coupling 52 couples drive motor 50 to the carousel scanner by means of the members 54 and 56.

The rotation of the carousel scanner 48 causes a plurality of flat mirrors 58 mounted on the outside edge or periphery of the carousel 48 to sequentially scan the reflecting surface of the mirror segment 46. The image which is picked up by the flat mirrors 58 as it intersects the spectral path of the image appearing on the mirror segment 46 is reflected to a photodetector array 60 which is operable to produce an electrical signal which is modulated by the light and dark areas instantaneously scanned in linear fashion horizontally across the reflecting surface of the mirror segment 46. The vertical scan is provided by the rocking and tilting motion of the object scanning mirror 27; however, when desired, the mirror 27 can be held stationary with the vertical scan being provided by motion of the vehicle 20 over the object being observed.

The rocking and tilting mechanism 26 is also driven by means of the drive motor 50 through a mechanical linkage of the timing belt drive 52 connected to pulley member 62 which in turn is coupled to a gear box 64 by means of the shaft 66. The shaft 66 is positioned by means of the bearings 75 and 77 and the gear box 64 is connected to the rocking and tilting mechanism assembly 26 by means of the shaft 66' and coupling members 67 and 68.

Referring now to FIGURE 3, the mechanical details of the carousel scanner 48 is shown in greater detail. FIGURE 3 moreover is a top plan view of the configuration shown in FIGURE 2. The carousel scanner 48 is comprised of a circular plate member 70 having a plurality (six) of rectangular openings or apertures 72 equally spaced around the periphery of the plate member 70 and located outwardly near the periphery thereof. The plurality (six) of flat mirrors 58 are located on the circular plate member 70 so that one flat mirror 58 is associated with each aperture 72. The mirrors 58 are mounted at right angles to the plate member 70 such that the reflecting surfaces thereof are directed inwardly of the carousel scanner.

The photodetector array 60 is located on the near side of the plate member 70 between the limits of the periphery and the center axis 12 such that it lies in the focal plane of the mirrors 58 similar to point 13 as shown in FIGURE 1. On the opposite side of the plate member 70 is located the mirror segment 46 with its spherical reflecting surface directed to both the stationary mirror 40 and the flat mirrors 58 located on the carousel scanner 48.

It can be observed that as each flat mirror 58 rotates the image formed by the concave reflecting surface of the mirror segment 46 will be reflected to the face of the flat mirrors 58 sequentially through the rectangular opening 72 and folded onto the detector array 60. Furthermore, it will be appreciated that as the flat mirror 58 moves in its circular path, it will scan the image 84, 85, 86, formed by the surface of the mirror segment 46 in a horizontal line. The detector array 60 comprising at least one photodetector element and preferably a plurality of such elements is mounted vertically with respect to the face of the flat mirrors 58. Each detector element of the array 60 then will be responsive to portions of the vertical dimension 37 of the image formed by mirror segment 46 which is shown more fully in FIGURE 2.

Each detector element of the array 60 produces an electrical signal in response to the instantaneous light directed thereto by the flat mirrors 58. When the detector elements are coupled to an indicator device 63 such as a cathode ray oscilloscope by means of suitable signal amplifier apparatus 65, each detector element will describe a horizontal trace on the face of the cathode ray tube face.

The concave reflecting surface of the mirror segment 46 has a spherical contour 80 with its center at 83 shown in FIGURE 3. Also shown are points 81 and 82 which correspond to the effective entrance aperture for the mirror 46 if we imagine the ray paths "unfolded" by removing mirror 40 (see FIGURE 2) and allowing rays 36 and 38 to fall as extensions to rays 42 and 44 respectively. In this "unfolded" drawing the new position of the rocking mirror would fall between points 81 and 82, i.e., the rocking mirror 27 itself acts as entrance aperture for the reflector 46.

The lines 90 and 91 on FIGURE 3 correspond to the outline of a bundle of parallel rays from a distant point object passing through the entrance apertures 81 and 82 respectively. After reflection in the spherical mirror surface 80, all rays of this bundle converge into an image point 84. However, at the particular position of mirror 58 as shown in FIGURE 3, the rays converging on point 84 are intercepted by mirror 58 and redirected onto the stationary detector 60.

As mirror 58 is set in motion around the axis 12, it will in turn intercept the rays converging on other points along the image surface such as point 85, which is the focus for the ray-bundle outlined by 92 and 93; and point 86, which is the focus for the bundle 94 and 95. The image points 84, 85 and 86 lie on a curve, which is a circle with center in point 83. This curve relates to curve 16 shown in FIGURE 1. By use of the mathematical equations relating to FIGURE 1, one selects the position 60 (FIGURE 3) of the detector, position 12 of the carousel rotation axis and the distance R between carousel mirrors and the rotation axis. The selection is based on providing the desired match between the curve 16 and the image curve: 84–85–86.

All rays from a distant point object entering mirror surface 80 do not in general converge accurately into one image point. This error in perfect convergence is known as aberration. The deviation of each individual ray from a perfect focus depends on the distance between that ray and the center 83 of the spherical mirror upon entry to the optics. The placement of the limiting entrance aperture, points 81 and 82, near the center 83 will for a given size of the aperture minimize the distance which can occur between individual rays and the center 83. This has the dual effect of minimizing the aberrations for any particular image point (such as 84, 85 and 86) and of providing equally sharp focus for all points of the image.

As stated earlier, the location of the rocking and tilting mirror 27 when "unfolded" coincides with the entrance aperture 81 to 82. This is considered an essential element of the present invention because it provides the optimum focus for all points of the image, it minimizes the necessary size of the rocking and tilting mirror 27 and it minimizes the size of the required window 24 which may be placed near the mirror 27.

It is, however, not considered a deviation from the teachings of this invention if the rocking and tilting mirror 27 is not placed at the "unfolded" position 81 and 82 as long as a mask limiting the entrance aperture is placed at 81 and 82 instead. Neither does it constitute a deviation if the rocking and tilting mirror 27 is deleted so as to permit the vehicle motion to perform this scan or if the mirror 27 is replaced by two mirrors, one which rocks and one which provides the tilting. The folding mirror 40 may also be deleted or replaced by a plurality of stationary folding mirrors. None of the above design variations constitute a deviation of this invention as long as the position of the effective entrance aperture of the "unfolded" optical path is near the center 83 of the spherical mirror 80.

Furthermore, the surface 80 of the mirror 46 may deviate from an exact sphere so as to provide an image curvature other than the circular arc shown as 84, 85 and 86 or so as to provide a more accurate focus for points of the image. For the same reasons, the surfaces of the flat mirrors 40 and 29 or their substitutes may deviate from perfect planes. The image focus or curvature may also be improved by means of figured refractive elements placed in the optical path between the objects and the mirror 46 so as to form catadioptric systems known as Schmidt, Bowers, Masksutow, etc. It is however a preferred embodiment of this invention to avoid refractive elements and to rely on reflecting surfaces only so as to provide a scanning mechanism which will perform equally well for any wavelength of the incoming radiation.

It will also be appreciated with reference to FIGURE 3 that since six flat mirrors 58 are mounted on the circular plate member 70, six scans of the reflecting surface of the mirror segment 46 will take place for each revolution of the carousel 48.

What has been described therefore is a mechanical imaging device which linearly scans a field of view by means of the rotation of a plurality of reflecting mirrors in a carousel fashion. Moreover, this rotary movement of the mirrors in front of the field of view provides a linear scan in one dimension across the field of view at a substantially higher rate than the mechanical movement of the apparatus. Moreover, the present invention provides for a linear scan in the transverse dimension by means of a rocking and panning mechanism which varies the field of view transverse to the scanning motion. This transverse movement, moreover, can be effected by moving the vehicle containing the subject invention over the object under observation.

While there has been shown and described what is considered at present to be the preferred embodiment of the invention, modifications thereto will readily occur to those skilled in the art. It is not desired, therefore, that the invention be limited to those specific arrangements shown and described but it is to be understood that all equivalents, alterations, and modifications within the spirit and scope of the invention herein are meant to be included.

What is claimed is:

1. A mechanical imaging device operative in any spectral region comprising in combination:

carsousel scanning apparatus comprising a substantially circular plate member having a center axis and a plurality of substantially equally spaced apertures located proximate to the periphery of said plate member and first reflector means located adjacent each of said plurality of apertures for reflecting spectral energy inwardly of said periphery when each said first reflector means intersects a spectral path;

motor means coupled to said circular plate member for providing rotation thereof about said center axis;

at least one photodetector element selectively located adjacent said circular plate member for receiving spectral energy reflected from said first reflector means for providing a light modulated electrical signal output when said carousel scanning apparatus is rotated about said center axis;

second reflector means having a predetermined contoured reflcting surface located adjacent said circular plate member on the opposite side of said plate member from said at least one photodetector element for directing spectral energy toward said first reflector means through said plurality of apertures, the carousel scanning apparatus scanning said second reflector means thereby upon rotation about said center axis; and third reflector means directed toward an object to be scanned and being selectively located with respect to said second reflector means to translate a field of view of said object thereto such that said second reflector means and said third reflector means define said spectral path.

2. Apparatus as defined by claim 1 wherein said at least one photodetector element is selectively located adjacent said circular plate member between the limits of said periphery and said center axis in the vicinity of the focal point of said first reflector means.

3. Apparatus as defined by claim 1 wherein said motor means is adapted to rotate said circular plate member at a substantially constant rate.

4. Apparatus as defined by claim 1 wherein said third reflector means includes a flat scanning mirror which is selectively movable to scan an object both in a vertical and in a horizontal plane with respect to said object.

5. Apparatus as defined by claim 1 wherein said third reflector means includes an object scanning mirror which is selectively movable, having two degrees of freedom, and including means to be driven from said motor means.

6. Apparatus as defined by claim 1 wherein said second reflector means comprises a mirror segment having a concave reflecting surface of a predetermined contour, said reflector means being located with respect to said carousel scanning apparatus that the focal point of said concave mirror surface falls behind said first reflector means so that said first reflector means scans an image formed by said concave reflecting surface and directs spectral energy in accordance therewith onto at least one photodetector element.

7. Apparatus as defined by claim 1 wherein said at least one photodetector element is one element of a photodetector array comprising a plurality of photodetector elements.

8. Apparatus as defined by claim 1 wherein said second reflector means includes a mirror having a concave reflecting surface of a predetermined contour, and wherein said third reflector means comprises an object scanning mirror which is selectively movable and directed to an object and a plane mirror which is stationary and is located with respect to said object scanning mirror and said concave reflecting surface of said second reflector means such that a spectral path is defined which directs an image appearing at said scanning mirror to said plane mirror and then to said concave reflecting surface, whereupon said carousel scanning apparatus scans said image formed by said concave reflecting surface by sequentially bringing each said first reflector means into the spectral path of the reflected image on said concave reflecting surface.

9. Apparatus as defined by claim 1 wherein said each first reflector means comprises a mirror having a flat reflecting surface which is adapted to receive reflected spectral energy from said second reflector means and direct it to said at least one photodetector element.

10. Apparatus as defined by claim 1 wherein said plurality of substantially equally spaced apertures comprise sides which substantially describe a parallelogram.

References Cited

UNITED STATES PATENTS

| | | | |
|---|---|---|---|
| 2,406,318 | 8/1946 | Brace | 250—236 X |
| 2,617,891 | 11/1952 | Karolus et al. | 250—236 X |
| 3,153,723 | 10/1964 | Weiss | 250—236 X |

JAMES W. LAWRENCE, *Primary Examiner.*

V. LAFRANCHI, *Assistant Examiner.*

U.S. Cl. X.R.

250—233